B. H. DIVINE.
TIRE.
APPLICATION FILED JAN. 13, 1912.
1,056,977.
Patented Mar. 25, 1913.
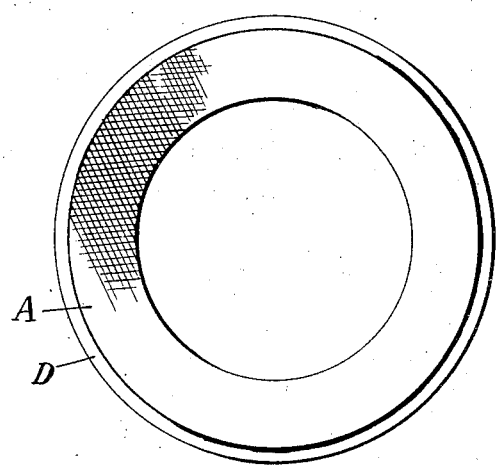
Fig-1
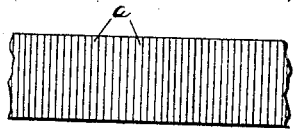
Fig-2
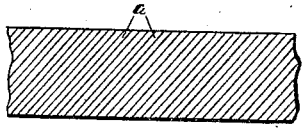
Fig-3
Fig-4
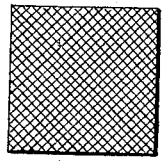
Fig-5ª
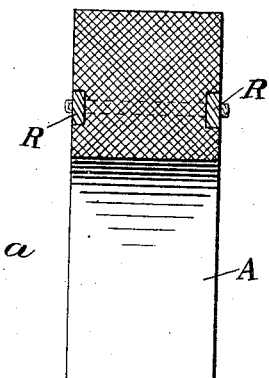
Fig-6
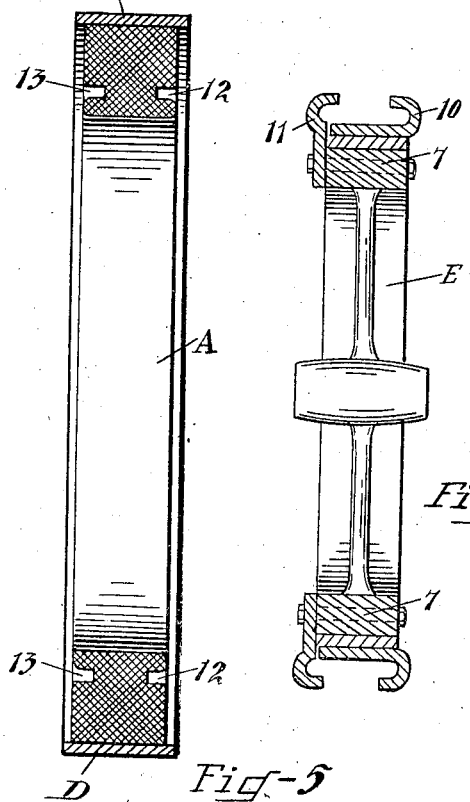
Fig-5
WITNESSES:
L. C. Snyder.
E. T. De Giorgi.
INVENTOR
Bradford H. Divine
BY
Henry M. Love
ATTORNEY

UNITED STATES PATENT OFFICE.

BRADFORD H. DIVINE, OF UTICA, NEW YORK.

TIRE.

1,056,977.   Specification of Letters Patent.   Patented Mar. 25, 1913.

Application filed January 13, 1912. Serial No. 670,999.

*To all whom it may concern:*

Be it known that I, BRADFORD H. DIVINE, a citizen of the United States, residing at Utica, in the county of Oneida and State of New York, have invented certain new and useful Improvements in Tires, of which the following is a specification, reference being had therein to the accompanying drawing.

My invention relates to a vehicle tire, and I declare that the following is a full, clear, concise and exact description thereof, sufficient to enable one skilled in the art to make and use the same, reference being had to the accompanying drawings, in which like reference characters refer to like parts throughout.

The invention consists of a tire suitable for use on automobiles or other vehicles which are equipped for the attachment of detachable tires or rims. It provides a tire which can be put on the wheels of such vehicles, in some such way as rubber tires are, and in fact is a substitute for the tires that are common on such vehicles.

The device is a tire, pure and simple, and is to be distinguished from constructions where a rim is built into a wheel, as by clamping it between two disk-like members thus forming a single unit of permanently assembled parts, and constructions wherein peripherally disposed parts are assembled in the confines of a permanent band which is a part of the construction. So far as I have been able to learn no such device has been successfully used for traction purposes on road vehicles, nor has such a tire as I propose been constructed as a complete unit in itself alone, for use as a demountable or detachable rim, adapted by a given configuration to fit a given wheel.

In the drawings I simply illustrate one form of the rim to indicate a method of its construction, the treatment of its parts and how it may be used, all in a general way and without confining myself in the matters of detail shown.

Figure 1 is an elevation of a tire constructed in accordance with my invention and embodying a temporary or removable binder. Fig. 2 is a plane view of part of a tire, showing one arrangement of its parts. Fig. 3 is a like view of a part of a tire showing a different arrangement of the parts, but following out the same principle. Fig. 4 represents a blank from which the tire is made. Fig. 5, is a section of a tire constructed in accordance with my invention and provided with a temporary or removable binder. Fig. 5$^a$, is a section of a wheel adapted to receive the tire of Fig. 5, and provided with means to lock the tire thereto. Fig. 6 is a cross-sectional view of part of a tire and showing another means of holding the parts of the tire. Fig. 7, is a cross section through part of a tire constructed in accordance with my invention showing a temporary binder thereon.

Referring to the figures in detail the tire, designated generally by A, is made up of a series of blanks, $a$, $a$, disposed radially of the center of the tire. These blanks are preferably made of woven fabric, but I do not confine myself to the material of which the blanks are made nor to their construction as woven. They are so arranged that the threads of a woven blank will run diagonally across the blank. The blanks may be made of various fabrics or material and there may be a variety of such material in a given wheel. The high degree of pressure under which the blanks are compressed precludes the possibility that moisture or the like can enter into the tire, or any disintegration take place. Under such compression the blanks become an integral tire construction, so that in such a view as in Fig. 1, the lines which mark the several blanks or laminæ are obliterated and the cross-lines indicate only the section of a single substance. The blanks may be treated as preferred to fit them to resist the elements, moisture, chemicals or other deleterious substances or conditions of use. Such treatment may be made of the blanks but may also be made of the tire after the blanks are assembled. The blanks are arranged face to face and compressed by suitable means, so that finally very great force has been applied and the blanks have been compressed into a mass of very great density and strength.

The principle of my construction is that the blanks are at an angle to the line of the periphery but not necessarily at a right angle, and in Fig. 3 I show them therein arranged at about an angle of 45%. This disposition distributes lateral strain on the tire and does not lessen the resistance against breaking down at the edge.

After the blanks are compressed into the tire it is necessary that some means should be used to hold it until it has been put in its permanent mounting. When the tire has been made as indicated it is trimmed or finished to give it the desired dimensions and surface. This surface will fit it in internal diameter, and otherwise, to be mounted on the wheel for which it is intended. The several blanks may be cut of the desired form before being assembled. I provide a binder, which may be in the form shown in Fig. 5. I preferably use circumferential band D for holding the tire in shape after the same has been compressed, for shipping and applying the tire to the wheel. This band, when the tire is applied to the wheel, may be removed, and if the tire is applied to another wheel the band must be used for holding the parts in assembled position. This band I term a binding member, which must be detachable when the tire is applied to the wheel where it is to be used and is only used for holding the tire in position until it is locked in the holding member or means. If in the process of manufacture grooves are required to be cut in the opposite faces of the tire for applying the holding means, they may be cut when the binder is applied to the tire for holding the assembled parts in position, or the grooves may be formed by any cutting die. But, when these lateral grooves are formed the assembled tire must be held by the binding member. The lateral grooves in the tire may be formed by the cutting of the blank previous to applying the compression. There may be a plurality of binders and they need not be set into the tire. The binder may have the form of one or more rings R fastened to the side of the tire and set in if desired. The removable binder rings R, are shown in Fig. 6, set in grooves in the side faces of the tire to hold the tire in compressed assembled condition for manufacturing and shipping purposes. These rings R, can be removed when a permanent binder is applied or when the tire is secured in or on a wheel.

At Fig. 5 a portion of a tire is shown after being finished to fit into a usual type of wheel.

In Fig. 5ᵃ 7 is the felly of the wheel E. 10 and 11 are the tire clamping members, the tire having been flanged at 12 and 13 to be securely engaged thereby.

Tires of different interior diameter, area in cross-section and flanging or finish are provided to meet the conditions in which they are to be used.

Having described my invention, what I claim as new and desire to secure by Letters Patent, is:

A tire for a vehicle wheel consisting of a hard compact ring composed of transverse radially-arranged plies of woven fabric compressed circumferentially, radially and transversely of the ring, and a temporary binder for said tire to hold said plies in the assembled and compressed condition.

In testimony whereof I hereunto affix my signature in the presence of two witnesses.

BRADFORD H. DIVINE.

Witnesses:
HENRY M. LOVE,
ELEANOR T. DE GIORGI.